United States Patent [19]

Riederer

[11] 4,427,020
[45] Jan. 24, 1984

[54] APPARATUS FOR THE OVERHEAD HANDLING OF BOTTLES AND THE LIKE

[75] Inventor: Hans G. Riederer, Maienfeld, Switzerland

[73] Assignee: EMPAC AG, Samstagern, Switzerland

[21] Appl. No.: 317,899

[22] PCT Filed: Mar. 4, 1981

[86] PCT No.: PCT/CH81/00028
§ 371 Date: Oct. 30, 1981
§ 102(e) Date: Oct. 30, 1981

[87] PCT Pub. No.: WO81/02567
PCT Pub. Date: Sep. 17, 1981

[30] Foreign Application Priority Data

Mar. 4, 1980 [CH] Switzerland .................. 1698/80

[51] Int. Cl.³ ............................................. B08B 3/02
[52] U.S. Cl. ..................................... 134/127; 134/129; 198/597
[58] Field of Search .................. 134/124, 127, 129; 198/597, 626, 627, 457

[56] References Cited

U.S. PATENT DOCUMENTS 2,910,992  11/1959  Wilcox ........................... 134/127 X
3,556,847   1/1971  Prodzenski .................... 198/597 X
3,677,273   7/1972  Mahlstede et al. ............. 134/127

Primary Examiner—Robert L. Bleutge
Attorney, Agent, or Firm—Karl F. Ross; Herbert Dubno

[57] ABSTRACT

Upwardly open vessels are supplied horizontally to an intake location and are taken horizontally from an output location. Between these locations they are inverted and passed past a treatment device by an inverting conveyor having a pair of like endless chains supported on guides to define a transport path lying generally in a vertical plane and having an upstream end opening horizontally at the intake location, a downstream end opening horizontally at the output location, and an intermediate portion vertically offset from the intake and output locations. The chains have substantially parallel and laterally spaced conveying stretches extending and movable downstream along the path from the intake to the output location and past the treatment location and return stretches extending and movable upstream back along and outside the respective conveying stretches between the intake and output locations which can be laterally moved. Resilient clamping elements on the chains are turned laterally toward each other at the conveying stretches and project thereat into the transport path. A drive connected to at least one of the chains advances the conveying stretches downstream from the intake to the output location to grip upwardly open vessels at the intake location, invert the vessels and passing same past the treatment location, and reinvert the vessels and release same at the output location.

4 Claims, 4 Drawing Figures

U.S. Patent    Jan. 24, 1984    4,427,020

APPARATUS FOR THE OVERHEAD HANDLING OF BOTTLES AND THE LIKE

CROSS-REFERENCE TO RELATED APPLICATIONS

This application is a national-phase application of PCT/CH 81/00028 filed Mar. 4, 1981 and based upon Swiss national application 1698/80.0 filed Mar. 4, 1980 under the International Convention.

FIELD OF THE INVENTION

The present invention relates to an apparatus for the overhead or upside-down handling of bottles and the like with a conveying system rotating continuously in a vertical plane between a feed point and a discharge point having resilient clamping members for the clamping drive of the bottles and the like for moving them past a handling device in overhead manner.

In connection with the mass production, reprocessing or reclaiming of wide-necked and narrow-necked vessels, particularly bottles and the like made from glass, plastics, etc apparatuses of the aforementioned type are employed which bring the bottles and the like temporarily into an upside-down position in order to blow and/or wash therefrom in said position foreign bodies and residues such as grindings, dust, glass fragments, etc, to which end corresponding handling devices are equipped with air or water jets.

In known apparatuses of this type, the conveying system comprises a conveyor chain rotating in a vertical plane by means of two chain wheels and which has gripper means for displacing the bottles and the like.

The disadvantage of such apparatuses is that the bottles and the like must be fed in and/or out tangentially, which requires special measures to permit the incorporation of such apparatuses into existing production lines. It is also a disadvantage of such apparatuses that they require means for expanding the gripping means for receiving or releasing the bottles and the like. It is also disadvantageous that it is not easily possible to re-equip the known apparatuses with respect to their feed and discharge points, so that they are generally restricted to the original design. In addition, the handling or processing device such as an air jet is restricted to its point of installation.

OBJECTS OF THE INVENTION

The problem of the present invention is to provide an apparatus of the aforementioned type which is able therefore without difficulty to receive bottles and the like between its clamping members or to release the same again, whilst in particular permitting a free adaptation to all existing conveying systems of the particular production line.

SUMMARY OF THE INVENTION

According to the invention, this problem is solved in that, the conveying system comprises two synchronously rotating endless chains having a conveying side and a return side in each case, the conveying sides moving in the same direction and form parallel clamping jaws with an adjustable spacing, the reversal points of the two endless chains forming the feed-in point or discharge point for the bottles and the like, in the vicinity of the feed-in or discharge point the conveying path formed by the endless chains extends at least approximately horizontally and the handling device acts on the outer and/or inner vertical turning path of the conveying path.

It is possible without difficulty for the feed and discharge points to be in the same or different planes with respect to the upper or lower conveying path.

According to a preferred embodiment of the apparatus according to the invention, the distance between the conveying sides is adjustable and the feed point is laterally displaceably supported relative to the discharge point.

The construction can be such that the support means for the endless chains are hydraulically or mechanically adjustable by hand.

It is also advantageous if on the clamping jaw side, the endless chains have elastic clamping members.

It is advantageous if the handling or processing device comprises air and/or water jets, it being appropriate if the construction is such that the distance between the handling device and the conveying path formed by the endless chains is adjustable.

As a result of these measures, it is now possible to adapt the apparatus for the overhead handling of bottles and the like to any production line and any construction. The possibility is in particular provided of a horizontal feed and removal of the bottles and the like in the same or different planes, as well as with a lateral displacement.

BRIEF DESCRIPTION OF THE DRAWING

The above and other objects, features, and advantages will become apparent from the following, reference being made to the attached drawing, which shows in.

SPECIFIC DESCRIPTION

Figure 1:
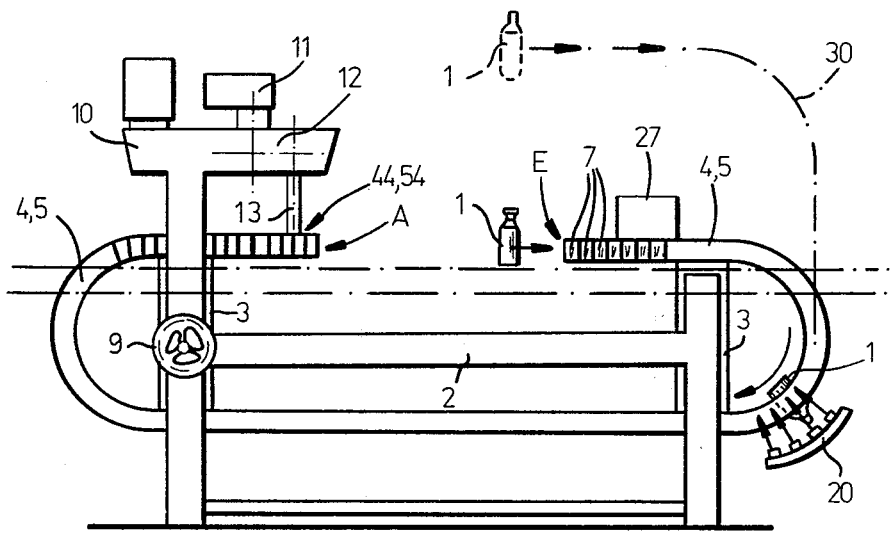
FIG. 1 a diagrammatic side view of the first embodiment of the apparatus according to the invention.
Figure 2:
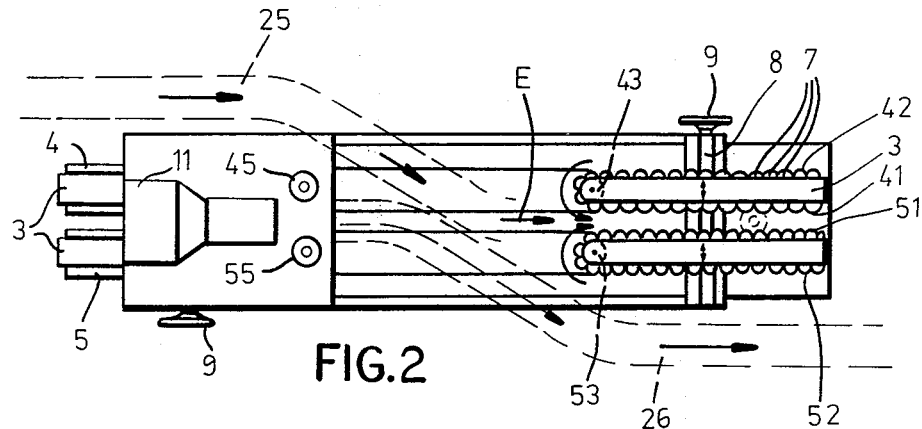
FIG. 2 a plan view of the arrangement of FIG. 1.

According to FIGS. 1 and 2, the apparatus for the overhead handling of bottles 1 comprises a machine frame 2, which is appropriately surrounded by here not shown casing plates in order to keep the surrounding area free from the working medium used and for accident prevention reasons.

By utilizing supporting means 3, this machine frame 2 carries a conveying system which in this case comprises two endless chains 4 and 5 synchronously rotating in a vertical plane. Each of these endless chains has a so-called conveying side 41 or 51 and a so-called return side 42 or 52. As can in particular be gathered from FIG. 2, the conveying sides 41 and 51 move in the same direction and form parallel clamping jaws. Furthermore, the reversal points 43, 53 or 44, 54 of the two endless chains 4 and 5 form the feed-in point E or discharge point A for bottles 1.

As can also be gathered from FIG. 2, on the jaw side the endless chains 4 and 5 carry elastic clamping members 7, e.g. made from rubber hose portions or the like, which makes it possible to securely take up and grip different shapes of vessels 1 to be treated. Larger differences in the external dimensions can be handled by changes in the lateral spacing between the two endless chains 4 and 5 or between their conveying sides 41 and 51. To this end, the supporting means 3 comprise transverse threaded spindles 8 enabling the lateral spacing to be adjusted by regulating the endless chains 4 and 5 or their supporting means 3 relative to one another by suitable actuating means, e.g. a handwheel 9.

The two oppositely moving endless chains 4 and 5 are driven by a motor 11 with an appropriately adjustable transmission 12 mounted on a bracket 10 on machine frame 2. Transmission 12 comprises two oppositely rotating shafts 13, which in each case drive a chain wheel 45 or 55. This drive is in this case arranged at the discharge point A. However, it is naturally possible to position the drive at the feed-in point A and optionally also within machine frame 2.

As can be clearly seen in FIGS. 1 and 2, the feed-in point and discharge point A are in the same plane as the upper part of the conveying path. The bottles are supplied to the feed point E by an angularly displaced feed belt 25 and are removed from discharge point A by an also angularly displaced discharge belt 26. The bottles taken up by endless chains 4, 5 follow the conveying path formed thereby over external turning paths and in this case a handling or processing device 20 is positioned on the turning path close to the point E. Device 20 can comprise air and/or water jets for cleaning the inside of bottles 1. The arrangement is preferably such that, as a function of the size of the bottles used, the distance between the processing device 20 and the conveying path formed by the endless chains 4 and 5 can be adjusted. Further processing devices can be arranged along the lower return path, where the bottles are once again in the upside-down position.

It is also advantageous to provide both at the feed and discharge points, not shown jam or accumulation control switches. Appropriately, a bottle control device 27 was provided at least in the vicinity of feed-in point E.

The aforementioned apparatus is in particular characterized by its simple frame construction in which any contact between the containers and the metal parts of the apparatus can be avoided in that the bottles and the like enter directly from the feed belt between the clamping members 7 and from there can be moved away again on the discharge belt. This permits a particularly silent operation. Due to the construction of the conveying system with the two separate endless chains, working can take place directly from the feed belt or discharge belt, thereby obviating the need for one-stroke screws, star wheels, etc. Furthermore, relative displacement between the two endless chains permits a delay-free setting of the apparatus in the case of a size change. The aforementioned apparatus can also be installed without difficulty in the existing conveyor belt system of the customer. Existing feed and discharge control means for the bottles and the like can be used for producing the switch-off signals for the apparatus and processing devices in the case of a product jam or accumulation.

In addition, the aforementioned apparatus can easily be modified for further adaptations to existing customer conveying systems by placing feed point E and discharge point A in the same or different planes with respect to the upper or lower conveying path.

In the embodiment of FIG. 1, a broken line 30 shows the possibility of placing the feed-in point E in a higher plane. This would, for example, permit a linear arrangement of the feed belt.

Figure 4:
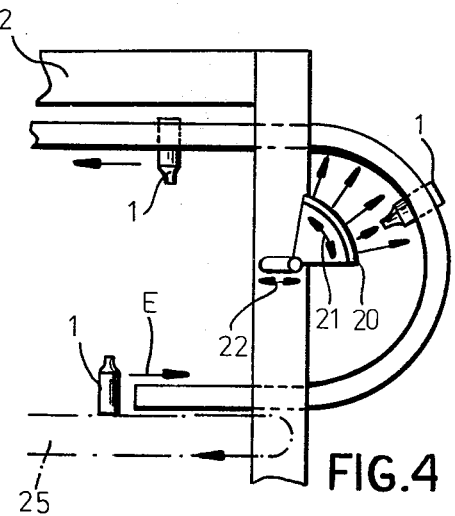
FIG. 4 a diagrammatic cutaway view of another embodiment of the apparatus according to the invention.

However, in the embodiment of FIG. 4, the feed-in point E is in the plane of the lower conveying path. This cutaway view not showing discharge point A makes it clear that the processing device 20 is positioned within the turning path of the conveying path for bottles 1. Arrows 21 and 22 indicate the adjustability of processing device 20.

Figure 3:
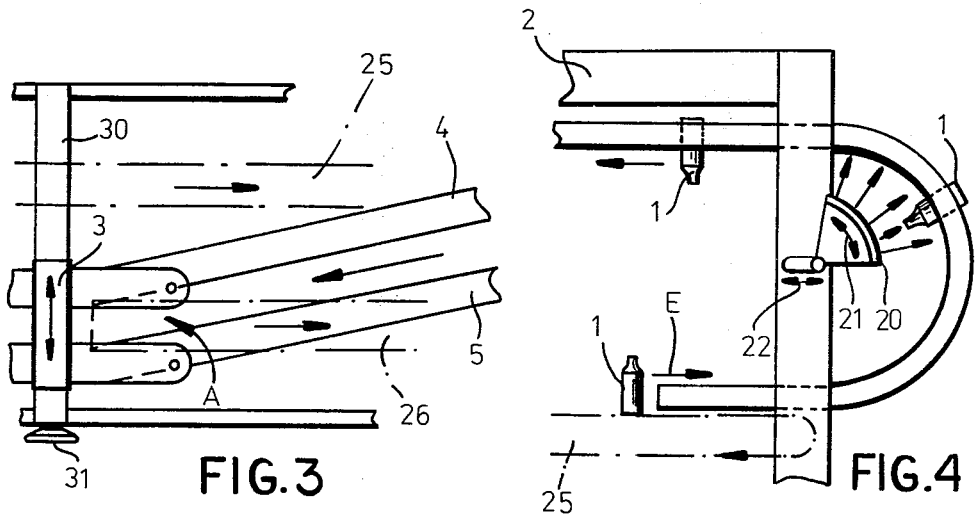
FIG. 3 a cutaway plan view of a second embodiment of the apparatus of the invention.

A further adaptation of the system is possible if, in accordance with FIG. 3, the feed point is laterally displaced relative to the discharge point. For this purpose, the supporting means 3 for endless chains 4, 5 at the not shown feed point or discharge point A can be positioned in horizontally displaceable manner on cross-struts 30 and can be displaced hydraulically or mechanically by means of handwheel 31. As a result, both feed belt 25 and discharge belt 26 can be completely linear. Due to their subdivision, the resulting deflection of the endless chains 4 and 5 causes no problems.

In other words the instant invention is a vessel-inverting conveyor used in combination with a system 25 for supplying upwardly open vessels 1 to an intake location E, a device 20 for treating upside-down vessels 1 at a treatment location adjacent the intake location E, and a system 26 for taking upwardly open treated vessels 1 from an output location A adjacent the intake location E. The vessel-inverting conveyor has a pair of like endless chains 4 and 5 and guides 43, 44, 53, 54 carrying the chains 4 and 5 and defining a transport path lying generally in a vertical plane and having an upstream end opening horizontally at the intake location E, a downstream end opening horizontally at the output location A, and an intermediate portion vertically offset from the intake and output locations E and A. The cahins 4 and 5 have substantially parallel and laterally spaced conveying stretches 41 and 51 extending and movable downstream along the path from the intake to the output location A and past the treatment location and return stretches 42 and 52 extending and movable upstream back along and outside the respective conveying stretches 41 and 51 between the intake and output locations E and A. Resilient clamping elements 7 on the chains 4 and 5 are turned laterally toward each other at the conveying stretches 41 and 51 and project thereat into the transport path. Means 9 connected to the guides 43, 44, 53, 54 laterally displaces same and thereby laterally moving the ends of the transport path and means 30 and 31 in FIG. 3 can adjust the lateral spacing between the conveying stretches 41 and 51 in the path. Thus this lateral spacing can be generally set to be equal to the vessel diameter. A drive 11, 12, 45, 55 connected to at least one of the chains 4 and 5 for advancing the conveying stretches 41 and 51 downstream from the intake to the output location A and thereby gripping upwardly open vessels 1 at the intake location E, inverting the vessels 1 and passing same past the treatment location, and reinverting the vessels 1 and releasing same at the output location A.

I claim:
1. In combination with:
a system for supplying upwardly open vessels to an intake location;
a device for treating upside-down vessels at a treatment location adjacent the intake location; and
a system for taking upwardly open treated vessels from an output location adjacent the intake location, a vessel-inverting conveyor comprising:
a pair of like endless chains;
guides carrying the chains and defining a transport path lying generally in a vertical plane and having an upstream end opening horizontally at the intake location, a downstream end opening horizontally at the output location, and an intermediate portion vertically offset from the intake and output locations, the chains having substantially parallel and laterally spaced conveying stretches extending and movable downstream along the path from the intake to the output location and past the treatment location and return stretches extending and movable upstream back along and outside the respective conveying stretches between the intake and output locations;

resilient clamping elements on the chains turned laterally toward each other at the conveying stretches and projecting thereat into the transport path;

means connected to the guides for laterally displacing same and thereby laterally moving the ends of the transport path;

means for adjusting the lateral spacing between the conveying stretches in the path, whereby this lateral spacing can be generally set to be equal to the vessel diameter; and drive means connected to at least one of the chains for advancing the conveying stretches downstream from the intake to the output location and thereby gripping upwardly open vessels at the intake location, inverting the vessels and passing same past the treatment location, and reinverting the vessels and releasing same at the output location.

2. The inverting conveyor defined in claim 1 wherein the intake and output locations are vertically offset from each other.

3. The inverting conveyor defined in claim 1 wherein the treatment device includes means for spraying a fluid on the vessels at the treatment location.

4. The inverting conveyor defined in claim 1 wherein the intake location is laterally offset from the output location.

* * * * *